United States Patent [19]

Pavlovsky

[11] 4,203,183
[45] May 20, 1980

[54] MACHINE FOR TRIMMING CASTINGS

[75] Inventor: Rudolf Pavlovsky, Schaffhausen, Switzerland

[73] Assignee: Georg Fischer Aktiengesellschaft, Switzerland

[21] Appl. No.: 946,868

[22] Filed: Sep. 29, 1978

[30] Foreign Application Priority Data

Oct. 19, 1977 [CH] Switzerland .................. 12723/77

[51] Int. Cl.$^2$ ........................................... B23P 17/00
[52] U.S. Cl. ..................... 29/33 A; 29/564; 409/140
[58] Field of Search ..................... 29/33 A, 33 R, 564, 29/565, 561; 90/11 R, 17, 58 C

[56] References Cited

U.S. PATENT DOCUMENTS

| | | | |
|---|---|---|---|
| 3,228,266 | 1/1966 | Budney et al. | 90/58 |
| 3,469,306 | 9/1969 | Cloup | 29/564 |
| 3,564,706 | 2/1971 | Klingel | 29/564 |
| 3,712,175 | 1/1973 | Muller et al. | 90/17 X |

*Primary Examiner*—Gil Weidenfeld
*Attorney, Agent, or Firm*—Roylance, Abrams, Berdo & Farley

[57] ABSTRACT

A machine for removing flashing, burrs and the like from castings includes a base having a swivelable workpiece supporting table and inclined surfaces supporting a milling assembly on a saddle such that the saddle is movable, with the milling assembly, in a direction perpendicular to the axis of the spindle sleeve, and the assembly is swivelable on the saddle such that the sleeve axis remains parallel to itself. The spindle is also movable axially. An impact cutting tool is supported on the spindle sleeve and is driven by a piston and cylinder assembly to reciprocate rapidly in an operating position in which the impact tool axis is parallel to the spindle axis. The impact tool assembly is movable from the operating position to a rest position, either by retraction or by a pivoting mechanism. The apparatus can be automatically operated by using a pattern-following arrangement in which the workpiece itself is used as the pattern and the impact tool as the pattern follower. The impact tool has a small diameter to deburr small inside corners of castings.

13 Claims, 9 Drawing Figures

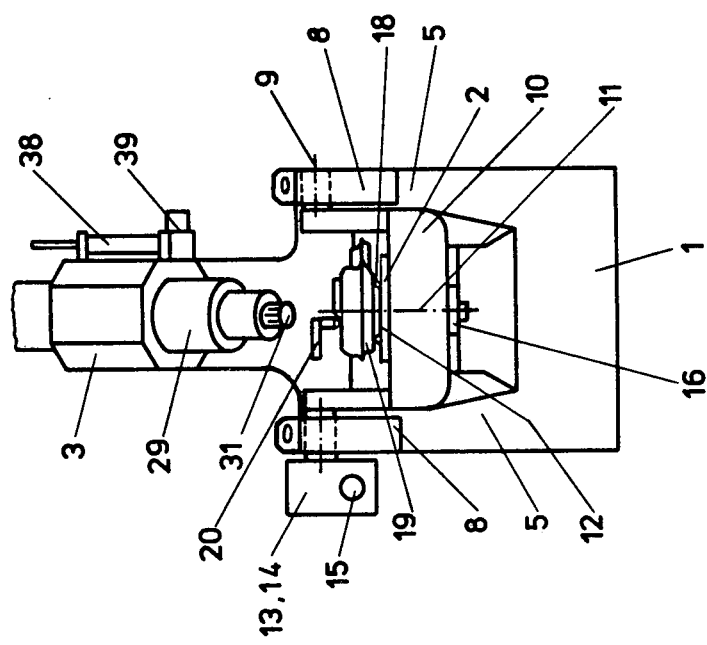
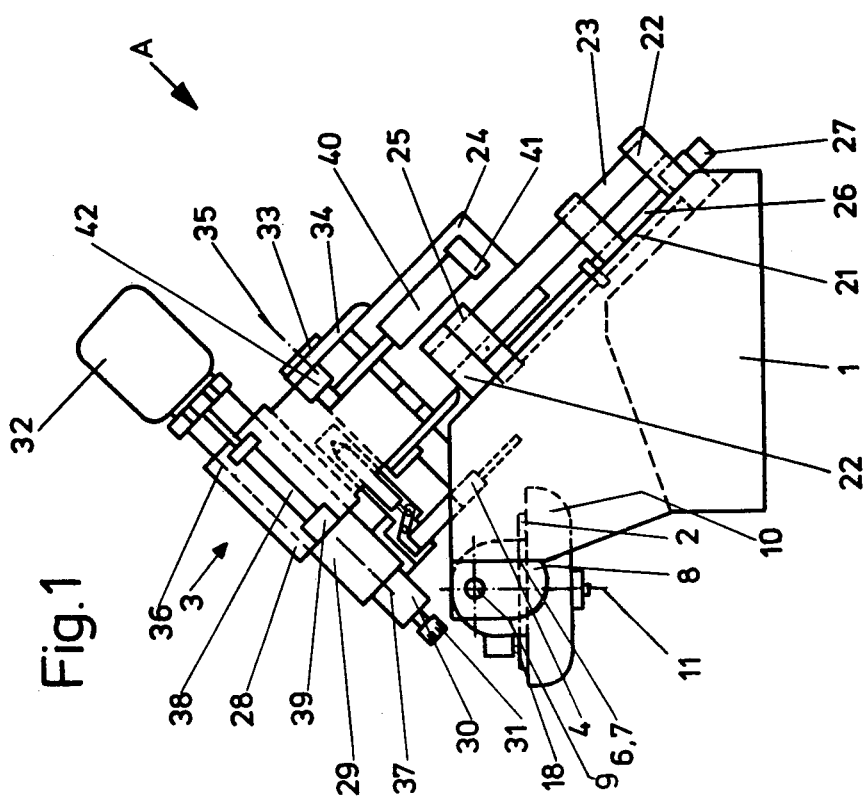

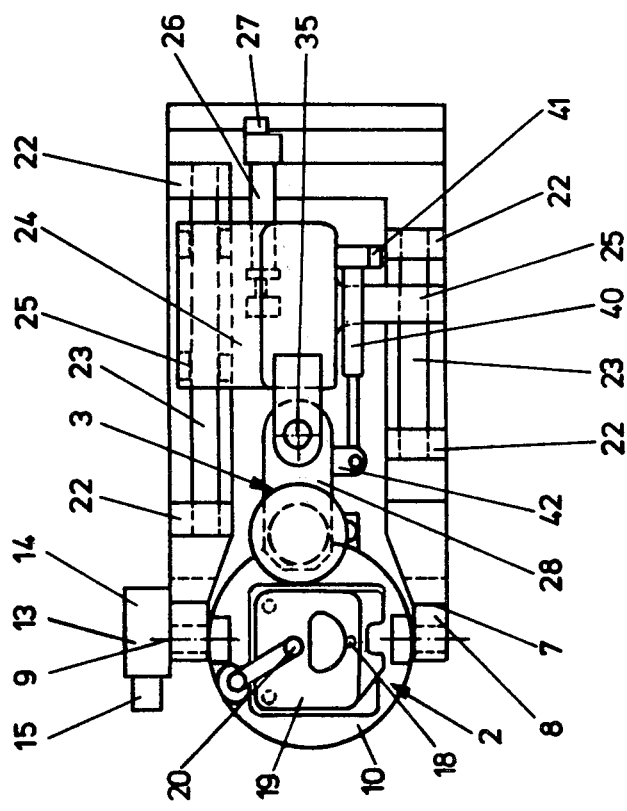

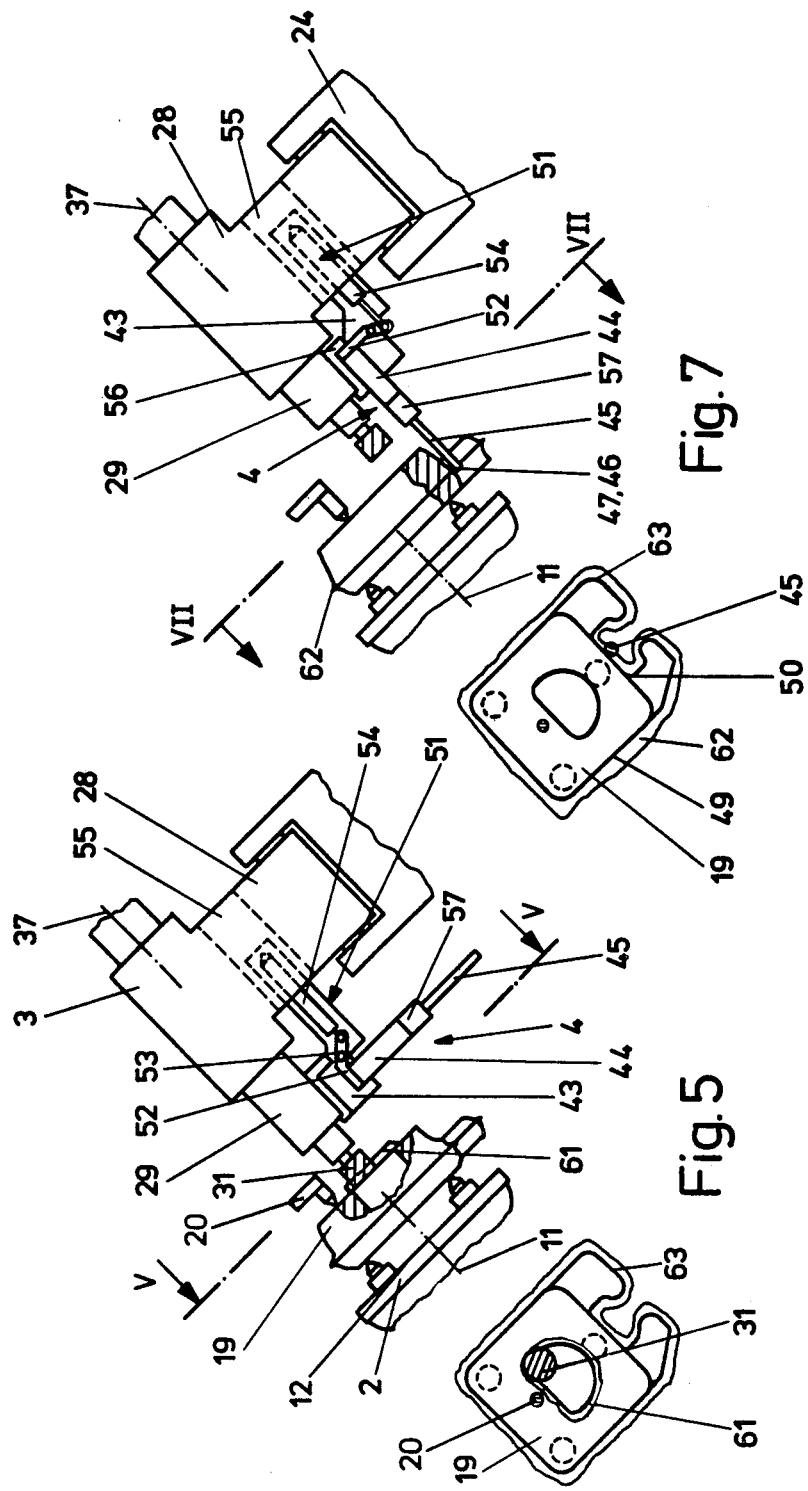

MACHINE FOR TRIMMING CASTINGS

This invention relates to a machine tool for the processing of workpieces, and particularly for the removal of flashings, core burrs, sprues and risers in raw-cast workpieces of various shapes.

BACKGROUND OF THE INVENTION

The removable of the remanence of knocked-off sprues and risers from raw-cast workpieces is normally accomplished by techniques such as grinding, cutting or sawing and the removal of flashings is then accomplished either manually by means of grinding discs or sanding belts or else by such devices as jet blasting machines. Operations using these various techniques require different machine installations, frequent clamping and handling of the workpieces, additional transportation paths and considerable manpower and is thus unprofitable.

It has been known to use combinations of machines for the removal of flashing wherein outside flashings are removed by grinding and inside flashings are removed by thrust tools which are adapted to the corresponding shape of the casting. One such system is known as the Sutter system and is shown in a prospectus number GA125/1 Georg Fischer AG. Such machines are economically advantageous only in the situation where there is a large number of workpieces of substantially the same shape and can be used only for very few workpieces which differ from each other in shape. Sprues and risers, in such an operation, must be removed beforehand on separate machines or by hand.

Milling machines of general construction are known by which the remanents of sprues or risers, and to some degree also flashings, may be milled off. The removal of inside and outside flashings, especially in the case of contours with inside corners, is not possible in the case of workpieces of varying shapes with such milling machines in one clamping operation. It is, as a minimum, necessary to reposition the workpiece between steps of the operation.

BRIEF DESCRIPTION OF THE INVENTION

An object of the present invention is to reduce the high labor and investment costs for the hitherto very expensive deburring of raw castings.

A further object is to provide a simple and sturdy machine tool for trimming casting which is usable to remove the remanents of risers and sprues as well as flashings and core burrs completely in one clamping from workpieces of frequently varying shapes.

It is yet another object to provide such an apparatus which is usable in an automatic method of operation.

A still further object is to provide an apparatus of this general type in which a thrust impact apparatus is mounted on a milling assembly, the impact apparatus having a reciprocatory oscillating thrust impact or filing tool. Briefly described, the invention includes a machine for processing cast workpieces to remove flashings, core burrs and the like comprising the combination of a base, a worktable supported by the base for supporting a workpiece to be processed, a milling assembly mounted on the base, the milling assembly having a milling cutter movable to contact the workpiece, and impact cutting tool means mounted on the milling assembly for contacting and cutting away portions of the workpiece, the impact tool means including an oscillating reciprocatory cutting tool.

In order that the manner in which the foregoing and other objects are attained in accordance with the invention can be understood in detail, particularly advantageous embodiments thereof will be described with reference to the accompanying drawings, which form a part of the specification, and wherein:

FIG. 1 is a side elevation of a machine tool in accordance with the invention;

FIG. 2 is a front elevation of the apparatus of FIG. 1;

FIG. 3 is an inclined view in the direction of arrow A of FIG. 1; but with the worktable turned by 45° and the milling assembly in the rear position FIG. 4 is a partial side elevation of the apparatus of FIG. 1, partially in section;

FIG. 5 is a sectional view along line V—V of FIG. 4;

FIG. 6 is a partial side elevation of the apparatus of FIG. 1 showing the use of the thrust tool portion thereof;

FIG. 7 is a partial section along VII—VII of FIG. 6;

FIG. 8 is a partial side elevation of the apparatus of FIG. 1 showing the use of the tool on a side of the workpiece; and FIG. 9 is a partial side elevation of a further embodiment of an apparatus in accordance with the invention showing a modified thrust tool apparatus.

As can be seen in FIGS. 1–3, the machine tool includes a base or stand 1, a worktable 2, a milling assembly 3 and an impact directing apparatus 4 mounted on and usable in conjunction with the milling assembly. The stand 1 is preferably formed from concrete and is constructed in the shape of an upwardly opening U with the upper surfaces of the two legs of the U being inclined or sloped toward the rear, preferably at an angle of about 45°. At the front 6 of the upper ends of each of the legs 5, there is provided a generally vertical attachment surface 7 to which supporting blocks 8 are fixedly attached as by screw fasteners. A housing 10 is pivotally mounted between blocks 8 so as to be swivelable about a horizontal swivel axis 9. A worktable 2 is rotatably mounted on housing 10 so that the table can be rotated about an axis 11 relative to housing 10, axis 11 being perpendicular to axis 9. Table 2 is provided with a clamping surface 12. Housing 10, and with it table 2, are pivotable about axis 9 by means of a swivel drive 13, clockwise through an angle of at least 135° from the horizontal position shown. Thus, when the housing has been rotated clockwise through an angle of 45° from the position shown, surface 12 lies in a plane perpendicular to spindle sleeve axis 37; and an additional rotation of 90° causes surface 12 to lie generally above that axis and parallel with it.

The swivel drive 13 preferably includes an hydraulic rotating drive 15 coupled to a worm gear drive 14. Another rotating drive motor 16, also preferably hydraulic, is mounted on housing 10 and is coupled to worktable 2 so that the worktable is rotatable through an angle of at least 360°. Base support members 18 can be provided in the clamping surface 12 of worktable 2 in such a way that three base support members 18 form the support for a workpiece 19. The locations of the base support members 18 can be established in correspondence with the shape of workpiece 19, in a well-known fashion. The workpiece is pressed from above against supports 18 by means of a clamping arrangement which includes a clamping claw 20 mounted on housing 10 but not illustrated in great detail, being fairly conventional in itself.

Each of inclined surfaces 21 of stand 1 is provided with two supporting brackets 22, these two brackets serving for the attachment of column guides 23. A saddle 24 for milling assembly 3 is mounted on these column guides 23 in friction bearings 25 so that the saddle 24 can be shifted longitudinally with respect to the guides. The longitudinal shifting of saddle 24 is accomplished by an hydraulic piston and cylinder assembly 26, the position and actuation of which is controlled by an electrohydraulic servo valve 27.

The milling assembly includes a housing 28 and a spindle sleeve 29 in which a milling spindle 30 with a milling tool 31 is mounted, the spindle and tool being driven by a motor 32.

Housing 28 is pivotably mounted in the front portion of saddle 24, facing the worktable 2, in two supporting brackets 34 which are provided with low friction bearings 33 in such a way that the swivel axis 35 is disposed perpendicular to the shifting direction of saddle 10. The spindle sleeve 29 is mounted longitudinally shiftable in friction bearings 36 of housing 28 such that the axis 37 of the spindle sleeve extends parallel to the swivel axis 35 and, as viewed from the direction of the worktable 2, it is disposed in front of swivel axis 35. The shifting of the spindle sleeve 29 and, thus, the adjustment of the milling tool 31 in its axial direction toward and away from the workpiece 19 is accomplished by means of a hydraulic piston and cylinder assembly 38 articulated with respect to the spindle sleeve 29 and housing 38, the assembly 38 being controlled by an electrohydraulic servo valve 39. The swiveling movement of housing 28 around axis 35 is accomplished by an hydraulic piston and cylinder assembly 40 which is concontrollable by an electrohydraulic servo valve 44, cylinder assembly 40 being pivotably connected to an arm 42 of the housing 28 and, at its other end, to saddle 24. The movements of the milling assembly and of the spindle sleeve, described herein, can also be accomplished by means of threaded spindles driven by electric or hydraulic motors.

Path and position measuring systems can be provided to indicate the various positions for each direction of movement of the milling assembly or of the spindle sleeve and worktable. In the case of rotary or swiveling movements, these devices can be in the form of function generators and, for a linear movement, they can be linear motion pickups, but these devices have not been shown in detail in the drawings. With these devices for indicating and producing signals representative of the various positions of the moving elements, and with the electrohydraulic servo valves, it is a relatively simple matter to provide automatic control for each of the movements in every axis and direction, and numerical control of the feed movements is therefore also possible.

The impact tool apparatus 4 is attached to the milling assembly 3, preferably to its spindle sleeve 29 on the side of the milling tool, by means of a mounting 43, and can advantageously be arranged to be movable between a rest position and an operating position.

The impact tool apparatus 4 includes an hydraulic cylinder 44 which can be actuated to reciprocate the piston thereof at a frequency,* and an impact tool 45. The impact tool 45 at its lower end has a cutting edge 46 of hardened metal (see FIG. 6) and the cutting surface 47 as well as the cross section of the impact tool is preferably formed round. Since the cutting force develops overwhelmingly in the axial direction of the impact tool 45, contrary to the forces in a milling tool, it is possible to use a slim tool with a small cross section. This makes possible the removal of flashings 62 on contours 49 of workpieces having inside corners such as 50 (FIG. 7) such that these flashings 62 can be removed by the long, slim tools, also, for example, on the supporting side, and in the case of relatively thick workpieces 19. Since in such castings, particularly in the corners, there can be minimum radii of about two millimeters, these can be deburred perfectly with impact tools with a minimal cross section of four millimeter diameter. For most circumstances, however, it is possible to use impact tools with a diameter of 8-10 millimeters. In this impact apparatus, filing tools may also be used in which case somewhat larger cross sections are required as a result of the lateral forces which occur.

*of 15 to 40 cps, preferably 25 cps

It will be understood that the impact tools described herein are essentially right circular cylindrical rods having a transverse end with a hardened edge and that the cutting action of these rods is similar in some respects to a chisel in that the tool is moved axially with respect to its own longitudinal axis, driving the cutting edge of the tool against the material to be removed. In the apparatus described herein, the tool is reciprocated axially, commonly at a relatively high frequency, and is moved along the material to be removed, resulting in a progressive chiseling away of the material to be cut. This is distinguished from a file in that the file is provided with sharpened cutting edges along its side and removes material by an action which is more analogous to abrasion.

The impact apparatus 4, as shown in FIGS. 4 and 6, is swivelably attached to the mounting 43 so that it can be moved by a swivel drive means from an operating position, in which the impact tool is parallel with the spindle sleeve axis 37, shown in FIG. 6, into a rest position in which the longitudinal axis of the tool extends at an angle of substantially 90° with respect to axis 37, as shown in FIG. 4. The hydraulic cylinder 44 is rigidly attached to a lever 52 which is pivotable about a pivot point 53 disposed on mounting 43. The piston rod of a cylinder 54 engages an end of the lever 52, the cylinder being attached to an extension of the mounting 43. Cylinder 54 is, at the same time, disposed partly in a recess 55 of the housing 28. The swiveling movement of the impact apparatus 4 thus occurs by supplying a fluid medium to cylinder 54, causing the lever to pivot about its pivot axis.

In the operating position shown in FIG. 6, lever 52 abuts a stop surface 56 of the mounting 43 so that the thrust forces are transferred to the cylinder 44 directly through the mounting 43 to the clamped-down spindle sleeve 29.

As will be seen from FIG. 9, the impact apparatus 4 can also be disposed with respect to the spindle sleeve 29 or the milling assembly 3 such that in the rest position, the impact tool 45 remains parallel to the spindle axis 37 in a retracted position and is moved into the work position, shown in dashed lines in FIG. 9, by means of a shifting arrangement 58 which can, for example, be a piston and cylinder assembly.

Since workpieces with variable contours are to be deburred in an automatic mode of operation to the extent possible, it is advantageous to arrange the apparatus such that the feed movements of the impact apparatus are controlled by means of a copying or scanning mechanism. At the same time, a conventional copying control with a pattern corresponding to the contour of the workpiece and an hydraulically or electrically operated feeler can be used.

In the machine tool apparatus described herein, however, the contour of the workpiece is scanned in the plane of the flashing directly by the impact tool 45. For this purpose, the impact tool 45 is attached in a scanning head 57 which is attached to the hydraulic cylinder 44 perpendicularly to the direction of thrust, yielding laterally in all directions, as a result of which it acts in cooperation with electric switching elements disposed in the scanning head 57 in the manner of the feeler of an electric copying control. As a result of the control impulses developed by the switches, the movement of saddle 24 and the rotary movement of worktable 2 around its swivel axis 11 are controlled.

The deburring of the contour of the workpiece is also possible by means of a numerical control in which the contour must be fed to the control in the form of numerical values or by way of a one-time instruction process for each contour.

For the milling off of the remnants of risers and sprues, only simple straight line movements of the milling assembly are required, and these can be controlled by a simple line control. As a result of the combination of the previously described direct scanning process for the deburring and of a single and inexpensive line control for the milling, a fully automatic method of operation with relatively small programming expenditures is possible, preferably as a result of an instruction process for the milling itself.

The method of operation of the machine tool described herein is as follows. In the starting position, the worktable 2 is horizontal as is clear from FIGS. 1 and 2. In this position, the workpiece 19 is placed on the supports 18 and is clamped down by the clamping claw 20 by a clamping mechanism. The worktable 2 is then swiveled forward (clockwise in FIG. 1) in order to remove sprue remnant 60 at the peripheral side of the workpiece 19 with the milling tool 31 (see FIG. 8). By rotating the worktable 2 around axis 11, all peripheral sides may be moved into appropriate positions for processing with the milling tool 21. The adjusting and feed movements of the milling tool take place during the milling process corresponding to the runoff, are fed in by an instruction process and stored in the control. After completion of the required milling work at the peripheral sides, the worktable 2 is swiveled back by 90° so that the clamping surface 12 lies in a plane substantially perpendicular to the axis 37 of the spindle sleeve. In this position it is possible to remove remnants of risers on the top side of the workpiece 19 or, as can be seen from FIGS. 4 and 5, core burrs 61, by means of the milling tool 31. With the worktable 2 in this same position, the flashing 62 is removed from the periphery of the workpiece 19 after completion of the milling work.

For this operation, the impact apparatus 4 is moved by means of the swivel arrangement 51 from the rest position corresponding to FIG. 4 into an operating position shown in FIG. 6. The flashing 62 is removed by the cutting edge 46 of the rapidly reciprocating impact tool 45 and, at the same time, the adjusting movement of the saddle 24 and the rotary movement around axis 11 of the worktable 2 are controlled by scanning the peripheral contour of the workpiece 19 using the impact tool 45 as a feeler. Thus, a completely automatic removal of the flashings 62 takes place in which the slotting tool 45 follows the abrupt changes of the direction of the peripheral contour with inside corners 50 and outside corners 63 and deburrs perfectly. When this operating process is completed, the impact apparatus 4 is swiveled into its rest position and the worktable 2 is rotated into the horizontal starting position. After assuming a starting position of the milling tool 31 in the highest position of the spindle sleeve 37, in the farthest left position of the housing 28 and in the lowest position of saddle 24, the removal of the completely deburred workpiece and the clamping down of a new one is easily accomplished since the worktable 2 is freely accessible. Even the handling of heavy workpieces with lifting tools is easily accomplished.

The machine tool of the invention makes possible the complete removal of remnants of sprues and risers as well as flashings and core burrs of various shapes and permits the deburring of workpieces having shapes which could only be deburred previously by hand and under the most difficult operating conditions. This is made possible by the slim slotting tool having a small cross section, used in conjunction with the milling assembly.

The arrangement of a swivelable and rotatable worktable makes possible the complete processing of the workpiece in one clamping of the piece to the table. As a result of the arrangement of the impact mechanism on the longitudinally shiftable spindle sleeve of the milling assembly, the same guide and feed arrangements can be used for required feed movements of the impact apparatus as for the milling assembly, as a result of which the machine is considerably simplified. The swiveling away, or shifting, of the impact apparatus permits unimpeded working with the milling tool. The arrangement of the milling assembly on the stand at 45° relative to the setting-up plane makes possible easy access to the worktable for clamping down and removal of the workpieces and good discharge of the chips during processing. Altogether, the cleaning cost of raw castings can be reduced with the machine tool according to the invention and the working conditions in the cleaning installations can be improved.

While certain advantageous embodiments have been chosen to illustrate the invention, it will be understood by those skilled in the art that various changes and modifications can be made therein without departing from the scope of the invention as defined in the appended claims.

What is claimed is:

1. A machine for processing cast workpieces to remove flashing, core burrs, sprues and risers comprising the combination of a base;

a worktable supported by said base for supporting a workpiece to be processed;

a milling assembly mounted on said base, said milling assembly having a milling cutter movable to contact the workpiece; and impact cutting tool means for contacting and cutting away portions of the workpiece, said impact tool means including an oscillating reciprocatory cutting tool, and mounting means for supporting said impact tool means on said milling assembly for movement between an operating position in which said cutting tool can contact the workpiece and a rest position, said cutting tool being substantially parallel with the central axis of said milling cutter in said operating position and being angularly separated from said milling cutting by an angle of about 90° in said rest position.

2. A machine according to claim 1, wherein said cutting tool has a substantially circular cross section and a diameter at its cutting end of between about 4 mm and about 10 mm.

3. A machine according to claim 1 wherein said impact tool means includes means responsive to lateral forces on said cutting tool for producing signals representative of contact with the sides of the workpiece, said signals being usable as scanning control signals.

4. A machine according to claim 1 wherein said milling assembly is mounted on said base with the axis of said milling cutter forming an angle of about 45° with the horizontal.

5. A machine according to claim 1 wherein said milling assembly includes a spindle sleeve for holding said milling cutter and mounting means for permitting the position of said spindle sleeve to be adjusted along lines perpendicular to the axis of said spindle sleeve and to be swiveled about a swivel axis parallel to the axis of said spindle sleeve, and drive means for adjusting the position of said sleeve.

6. A machine according to claim 5 wherein each of said drive means includes hydraulic piston and cylinder assemblies and electrohydraulic servo valves.

7. A machine according to claim 5 wherein said mounting means includes inclined guide members mounted on said base, the milling assembly being supported near the uppermost end of said guide members.

8. A machine according to claim 1, wherein said worktable includes a clamping surface against which the workpiece may be held;

means for rotatably supporting said clamping surface to permit swiveling movement thereof around a horizontal axis from a horizontal loading and unloading position to a first operating position in which said surface is substantially perpendicular to the axis of said milling cutter and to a second operating position in which said surface is substantially parallel with said axis; and first drive means for rotating said surface.

9. A machine according to claim 8 including means for mounting said worktable for rotation about an axis perpendicular to said clamping surface, and second drive means for rotating said table.

10. A machine according to claim 9 wherein said first and second drive means include hydraulic drives and electrohydraulic servo valves.

11. A machine according to claim 10 wherein said impact tool means includes means responsive to lateral forces for generating electrical impulses, and means for coupling said electrical impulses as control signals to said electrohydraulic servo valves in said first and second drive means.

12. A machine according to claim 1, wherein said milling assembly includes a longitudinally shiftable spindle sleeve and said impact tool means is mounted on said spindle sleeve.

13. A machine according to claim 1, wherein said impact tool means includes a hydraulic piston and cylinder assembly for driving said cutting tool, and means for causing said piston and cylinder to reciprocate at a frequency of 15 to 40 cycles per second.

* * * * *